United States Patent
Al-Fakih et al.

(10) Patent No.: US 12,459,862 B2
(45) Date of Patent: Nov. 4, 2025

(54) CEMENT PASTE COMPOSITION

(71) Applicant: KING FAHD UNIVERSITY OF PETROLEUM AND MINERALS, Dhahran (SA)

(72) Inventors: Amin Ali Ali Al-Fakih, Dhahran (SA); Sagheer A. Onaizi, Dhahran (SA); Waleed Ahmed Yaslam Al-Awsh, Dhahran (SA); Mohammed Ali Al-Osta, Dhahran (SA); Monther Qassim Ahmed Al-Koshab, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 469 days.

(21) Appl. No.: 18/077,680

(22) Filed: Dec. 8, 2022

(65) Prior Publication Data
US 2024/0199484 A1    Jun. 20, 2024

(51) Int. Cl.
*C04B 7/02* (2006.01)
*C04B 14/04* (2006.01)
(Continued)

(52) U.S. Cl.
CPC .............. *C04B 14/047* (2013.01); *C04B 7/02* (2013.01); *C04B 28/04* (2013.01);
(Continued)

(58) Field of Classification Search
CPC ......... C04B 14/047; C04B 7/02; C04B 28/04; C04B 40/0032; C04B 2201/20; C04B 2201/52; C04B 28/02
See application file for complete search history.

(56) References Cited

U.S. PATENT DOCUMENTS

2022/0089486 A1 * 3/2022 Jackson .................. C04B 14/24

FOREIGN PATENT DOCUMENTS

CN      108383446 B      9/2019
CN      111269623 B      9/2021
(Continued)

OTHER PUBLICATIONS

Zhou et al. Characterization and properties of Zn/Co zeolitic imidazolate frameworks vs. ZIF-8 and ZIF-67, Journal of Material Chemistry A, 5, 952-957 (Year: 2017).*

(Continued)

*Primary Examiner* — Amber R Orlando
*Assistant Examiner* — Anastasia A. Kuvayskaya
(74) *Attorney, Agent, or Firm* — Oblon, McClelland, Maier & Neustadt, L.L.P.

(57) ABSTRACT

A cement paste composition includes a curable component including a cementitious material and a zeolitic imidazolate framework-67 (ZIF-67) present in an amount of 0.01 to 3% by weight based on a total weight of the cementitious material. The composition further includes water in an amount of 30 to 50% by weight based on a total weight of the cement paste composition. A cured specimen made from the cement paste composition has a compressive strength of 30 to 80 megapascal (MPa) according to ASTM C109/C109M-21 standard test method, and a direct tensile strength of 1.2 to 2.2 MPa according to ASTM C307-18 standard test method. The ZIF-67 particles are uniformly distributed throughout the cured specimen. A method of producing the cement paste specimen.

13 Claims, 7 Drawing Sheets

(51) Int. Cl.
*C04B 28/04* (2006.01)
*C04B 40/00* (2006.01)

(52) U.S. Cl.
CPC ...... *C04B 40/0032* (2013.01); *C04B 2201/20* (2013.01); *C04B 2201/52* (2013.01)

(56) References Cited

FOREIGN PATENT DOCUMENTS

| | | | |
|---|---|---|---|
| CN | 114085061 A | 2/2022 | |
| IN | 202221042874 A * | 8/2022 | ............ C04B 111/00 |
| IN | 202221042874 | 12/2022 | |

OTHER PUBLICATIONS

Shamsaei, et al.; Zeolitic imidazolate framework nanoleaves (ZIF-L) enhancement of strength and durability of Portland cement composites; Construction and Building Materials, vol. 272; Feb. 22, 2021; 3 Pages; Abstract Only.

Al-Fakih, et al.; Mechanical, hydration, and microstructural behavior of cement paste incorporating Zeolitic imidazolate Framework-67 (ZIF-67) nanoparticles; Construction and Building Materials, vol. 348; Sep. 19, 2022; 3 Pages; Abstract Only.

* cited by examiner

CEMENT PASTE COMPOSITION

STATEMENT REGARDING PRIOR DISCLOSURE BY THE INVENTORS

Aspects of this technology are described in an article "Mechanical, hydration, and microstructural behavior of cement paste incorporating Zeolitic imidazolate Framework-67 (ZIF-67) nanoparticles" published in Construction and Building Materials, 2022, Volume 348, May 2022, 128675, which is incorporated herein by reference in its entirety.

BACKGROUND

Technical Field

The present disclosure is directed to cement compositions, and particularly to zeolite-based nanomaterials in cement compositions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Nanomaterials are used to enhance the durability and strength properties of cement-based materials. Nanomaterials possess unique physical and chemical features that distinguish them from traditional materials [J. A. Abdalla, B. S. Thomas, R. A. Hawileh, J. Yang, B. B. Jindal, E. Ariyachandra, Influence of nano-$TiO_2$, nano-$Fe_2O_3$, nanoclay and nano-$CaCO_3$ on the properties of cement/geopolymer concrete, Cleaner Materials (2022) 100061; M. S. M. Norhasri, M. S. Hamidah, A. M. Fadzil, Applications of using nano material in concrete: A review, Construction and Building Materials 133 (2017) 91-97]. Moreover, since a cement paste includes grains of hydrated calcium silicate gels, capillary pores, and large crystals of hydrated products, the nanomaterial particles may fill in such grains and pores, resulting in more durable and high-performance cement-based building materials [H. Li, H.-g. Xiao, J. Yuan, J. Ou, Microstructure of cement mortar with nano-particles, Composites Part B: Engineering 35(2) (2004) 185-189]. Nanoparticles exhibit an excellent filler effect by refining an intersectional zone (micro- and nano-pores in an open pores system) of hydrated cement and densifying the cement, resulting in a novel nanoscale structure having solid hydration [Y. Qing, Z. Zenan, K. Deyu, C. Rongshen, Influence of nano-SiO2 addition on properties of hardened cement paste as compared with silica fume, Construction and Building Materials 21(3) (2007) 539-545; M. Heikal, N. S. Ibrahim, Hydration, microstructure and phase composition of composite cements containing nano-clay, Construction and Building Materials 112 (2016) 19-27].

According to current advances in nano-engineered concrete, nanomaterials were found to be effective additives for partial cement replacement compared to the addition of supplemental cementitious materials, such as fly ash, silica fume, and ground granulated blast furnace slag [M. Sumesh, U. J. Alengaram, M. Z. Jumaat, K. H. Mo, M. F. Alnahhal, Incorporation of nano-materials in cement composite and geopolymer based paste and mortar—A review, Construction and Building Materials 148 (2017) 62-84]. However, the excessive inclusion of nanomaterials in the cementitious materials may result in agglomeration, as the nanomaterials are easy to aggregate due to corresponding great surface energy, which may have a negative impact on the characteristics of the cementitious materials [M. Heikal, N. S. Ibrahim, Hydration, microstructure and phase composition of composite cements containing nano-clay, Construction and Building Materials 112 (2016) 19-27; A. Sadeghi-Nik, J. Berenjian, A. Bahari, A. S. Safaei, M. Dehestani, Modification of microstructure and mechanical properties of cement by nanoparticles through a sustainable development approach, Construction and Building Materials 155 (2017) 880-891].

Nanomaterials are classified into 0, 1, and 2 dimensional (0D, 1D, and 2D) groups and each one has a corresponding set of advantages and ability to provide cementitious materials with improved characteristics. Nano-oxides, such as nano-silica ($SiO_2$), nano-alumina ($Al_2O_3$), nano titanium oxide ($TiO_2$), nano-zinc oxide (ZnO), and nano-ferric oxide ($Fe_2O_3$), are employed as 0D-nanoparticles in the construction industry [M. Kamal, M. Safan, M. Eltabey, E. S. Zaki, E. H. K. ABU, Compressive strength of Portland cement pastes and mortars containing Cu—Zn nano-ferrite, (2012)]. For instance, the nano-silica (spherical with a diameter of about 30 nanometers (nm)) can act as an ultra-filler which improves the workability and early strength of the cementitious materials as well as may act as a partial replacement for cement (20-30%) [G. Quercia, G. Hüsken, H. J. H. Brouwers, Water demand of amorphous nano silica and its impact on the workability of cement paste, Cement and Concrete Research 42(2) (2012) 344-357].

Alternatively, the nano-alumina may act as a nano-filler, a setting time controller (speeds up an initial setting time), and a dispersing agent which results in strength improvement and fire resistance enhancement [A. Nazari, S. Riahi, Improvement compressive strength of concrete in different curing media by Al2O3 nanoparticles, Materials Science and Engineering: A 528(3) (2011) 1183-1191; M. Heikal, M. N. Ismail, N. S. Ibrahim, Physico-mechanical, microstructure characteristics and fire resistance of cement pastes containing Al2O3 nano-particles, Construction and Building Materials 91 (2015) 232-242]. Adding nano-titanium oxide and nano-zinc oxide into the cementitious materials acts as self-cleaning materials that decompose a wide range of organic and inorganic air contaminants [V. P. Singh, K. Sandeep, H. S. Kushwaha, S. Powar, R. Vaish, Photocatalytic, hydrophobic and antimicrobial characteristics of ZnO nano needle embedded cement composites, Construction and Building Materials 158 (2018) 285-294; D. Shafaei, S. Yang, L. Berlouis, J. Minto, Multiscale pore structure analysis of nano titanium dioxide cement mortar composite, Materials Today Communications 22 (2020) 100779]. Using nano-ferric oxide improves the mechanical and textural properties and thermal resistance of cementitious materials [S. A. Abo-El-Enein, F. I. El-Hosiny, S. M. A. El-Gamal, M. S. Amin, M. Ramadan, Gamma radiation shielding, fire resistance and physicochemical characteristics of Portland cement pastes modified with synthesized Fe2O3 and ZnO nanoparticles, Construction and Building Materials 173 (2018) 687-706]. However, due to the low aspect ratio of the 0D-nanoparticles, the 0D-nanoparticles cannot arrest crack growth at the nano level.

The 1D nanomaterials are another group of nanomaterials used in cementitious materials. For instance, carbon nanotubes have a high aspect ratio of about 1000 (specific surface area of 1000 meter square per gram ($m^2/g$)) and are considered to be efficient reinforcing additives for cementitious materials [J. Makar, J. Beaudoin, Carbon nanotubes and their application in the construction industry, Proc., 1st Int. Symposium on Nanotechnology in Construction, National Research Council Canada, Ottawa, Ontario, 2003, p. 341]. However, the dispersion difficulties of nanotubes in a cement matrix and poor bonding between the nanotubes and the cement matrix interface made corresponding performance inadequate [A. M. K. Esawi, M. M. Farag, Carbon nanotube reinforced composites: Potential and current challenges, Materials & Design 28(9) (2007) 2394-2401].

The 2D nanomaterials, discovered recently for enhancing bonding strength, allowed the interaction of a cement matrix and nanoparticles in nanometre dimensions, resulting in a more robust bonding environment [E. Shamsaei, F. B. de Souza, X. Yao, E. Benhelal, A. Akbari, W. Duan, Graphene-based nanosheets for stronger and more durable concrete: A review, Construction and Building Materials 183 (2018) 642-660]. Recent 2D nanomaterials including graphene oxide (GO) and leaf-shaped zeolitic imidazolate framework (ZIF-L), have a higher specific surface area than the 1D nanomaterials and are more easily dispersable [H. Porwal, S. Grasso, M. J. Reece, Review of graphene-ceramic matrix composites, Advances in Applied Ceramics 112(8) (2013) 443-454]. Such characteristics of the 2D nanomaterials allow for more chemical and physical contact with cement composite than other nanomaterials, which helps to improve early strain capacity, densify a cement gel nanostructure, and bridge nanoscale cracks [B. Han, S. Sun, S. Ding, L. Zhang, X. Yu, J. Ou, Review of nanocarbon-engineered multifunctional cementitious composites, Composites Part A: Applied Science and Manufacturing 70 (2015) 69-81]. However, the mentioned 2D nanomaterials do not possess hydrophobic properties (repel water on contact), impacting the workability of the cementitious materials [E. Shamsaei, Z. Qing Tang, F. B. de Souza, E. Hosseini, E. Benhelal, A. Habibnejad Korayem, W. Duan, Zeolitic imidazolate framework nanoleaves (ZIF-L) enhancement of strength and durability of portland cement composites, Construction and Building Materials 272 (2021) 122015; B. Chen, Z. Yang, Y. Zhu, Y. Xia, Zeolitic imidazolate framework materials: recent progress in synthesis and applications, Journal of Materials Chemistry A 2(40) (2014) 16811-16831].

Although numerous nanomaterials have been identified in the past, there still exists a need to find an efficient nanomaterial that can overcome the limitations of the art.

In view of the forgoing, one objective of the present disclosure is to describe a cement paste composition containing a nanomaterial. A second objective of the present disclosure is to provide a method of making the nanomaterial. A further objective of the present disclosure is to provide a method of producing a cement specimen from the cement paste composition.

SUMMARY

In an exemplary embodiment, a cement paste composition is described. The composition includes a curable component, including a cementitious material and a zeolitic imidazolate framework-67 (ZIF-67) present in an amount of 0.01 to 3% by weight based on the total weight of the cementitious material. The composition further includes water in an amount of 30 to 50% by weight based on a total weight of the cement paste composition. A cured specimen made from the cement paste composition has a compressive strength of 30 to 80 megapascal (MPa) according to ASTM C109/C109M-21 standard test method and a direct tensile strength of 1.2 to 2.2 MPa according to ASTM C307-18 standard test method. The ZIF-67 particles are uniformly distributed throughout the cured specimen.

In some embodiments, the cementitious material includes at least one selected from the group consisting of portland cement, pozzolan cement, gypsum cement, aluminous cement, silica cement, and alkaline cement.

In some embodiments, the cementitious material is a type I ordinary portland cement (OPC). In some embodiments, the OPC has a standard specification of ASTM C150-21.

In some embodiments, the ZIF-67 is present in the curable component of the cement paste composition in an amount of 0.1 to 1% by weight based on the total weight of the cementitious material.

In some embodiments, the ZIF-67 particles have a mean particle size in a range of 5 to 150 nanometers (nm).

In some embodiments, the ZIF-67 particles have a porous structure and a mean pore size in a range of 0.5 to 5 nm.

In some embodiments, the water is at least one selected from the group consisting of tap water, groundwater, distilled water, deionized water, freshwater, and desalted water.

In some embodiments, the water is desalted water. In some embodiments, the desalted water is present in the cement paste composition in an amount of 35 to 45% by weight based on the total weight of the cement paste composition.

In some embodiments, the compressive strength of the cured specimen made from the cement paste composition is 40 to 50% greater than that of a cured specimen made from a cement paste composition without the ZIF-67 as determined by ASTM C109/C109M-21.

In some embodiments, the direct tensile strength of the cured specimen made from the cement paste composition is 100 to 120% greater than that of a cured specimen made from a cement paste composition without the presence of ZIF-67 as determined by ASTM C307-18.

In some embodiments, a cement specimen includes the cement paste composition in a cured form. In some embodiments, the cement specimen has a weight ratio of the water to the curable component is in a range of 0.3:1 to 0.5:1

In some embodiments, the cement specimen has a water absorption of 15 to 25% by weight based on a total weight of the cement paste composition after curing.

In some embodiments, the cement specimen has a dry density of 1.55 to 1.80 grams per cubic meter (g/cm$^3$) after curing.

In some embodiments, the cement specimen has a higher degree of hydration than a cement paste made from the same composition but without the ZIF-67 according to ASTM C1679-17 standard test method.

In some embodiments, the cement specimen has a plurality of calcium silicate hydrates. In some embodiments, the calcium silicate hydrate has a layered structure with a basal spacing of 5 to 20 angstroms (Å) and a sheet-like morphology.

In another exemplary embodiment, a method of producing the cement specimen includes casting the cement paste composition in a mold to form a casted cement paste. The method further includes curing the casted cement paste for 0.5-30 days and forming the cement specimen.

In further exemplary embodiments, a method of making the ZIF-67 is described. The method includes mixing and dissolving a cobalt salt in a first liquid to form a first solution. The method further includes mixing and dissolving an imidazole compound in a solution containing ammonia to form a second solution. The method further includes adding the first solution to the second solution under agitation to form a mixture. The method further includes reacting the cobalt salt from the first solution with the imidazole compound from the second solution to form the ZIF-67 in a ZIF-67-containing aqueous composition. The method further includes removing the ZIF-67 from the ZIF-67-containing aqueous composition and washing it to form a wet ZIF-67. The method further includes heating and drying the wet ZIF-67 to form the ZIF-67.

In some embodiments, the cobalt salt is at least one selected from the group consisting of cobalt sulfate, cobalt acetate, cobalt citrate, cobalt iodide, cobalt chloride, cobalt perchlorate, cobalt nitrate, cobalt phosphate, cobalt triflate, cobalt bis(trifluoromethanesulfonyl)imide, cobalt tetrafluoroborate, cobalt bromide, and/or its hydrate.

In some embodiments, the imidazole compound includes an imidazole of formula (I) and a benzimidazole of formula (II):

Where $R_1$, $R_2$, $R_3$, $R_4$, $R_5$, $R_6$, $R_7$, and $R_8$ are each independently selected from the group consisting of hydrogen, an optionally substituted alkyl, an optionally substituted cycloalkyl, an optionally substituted alkoxy, a hydroxyl, a halogen, a nitro, and a cyano.

In some embodiments, a molar ratio of the cobalt salt to the imidazole compound present in the mixture is in a range of 1:2 to 1:6. In some embodiments, the imidazole compound is 2-methylimidazole.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

As used herein, the words "substantially similar", "substantially identical", "approximately", or "about" unless otherwise specified may be used when describing magnitude and/or position to indicate that the value and/or position described is within a reasonable expected range of values and/or positions. For example, a numeric value may have a value that is ±1% of the stated value (or range of values), ±2% of the stated value (or range of values), ±5% of the stated value (or range of values), ±10% of the stated value (or range of values), or ±15% of the stated value (or range of values).

As used herein, the term "optionally substituted alkyl" refers to the alkyl group which is substituted with one, two, or three substituents independently selected from hydroxyl, alkoxy, carboxy, cyano, alkoxycarbonyl, alkylthio, alkylsulfonyl, halo, haloalkoxy, —CONRR' or —NRR' (where each R is hydrogen, alkyl, hydroxyalkyl, or alkoxyalkyl, and each R' is hydrogen, alkyl, or cycloalkyl) or heterocyclyl (preferably heterocycloamino) optionally substituted with one or two groups independently selected from alkyl, hydroxyl, alkoxy, alkylsulfonyl, halo, or —CONRR' where R and R' are as defined above.

As used herein, the term "optionally substituted cycloalkyl" refers to the cycloalkyl group which is substituted with one, two, or three substituents independently selected from hydroxyl, alkoxy, carboxy, cyano, alkoxycarbonyl, alkylthio, alkylsulfonyl, halo, haloalkoxy, —CONRR' or —NRR' (where each R is hydrogen, alkyl, hydroxyalkyl, or alkoxyalkyl, and each R' is hydrogen, alkyl, or cycloalkyl) or heterocyclyl (preferably heterocycloamino) optionally substituted with one or two groups independently selected from alkyl, hydroxyl, alkoxy, alkylsulfonyl, halo, or —CONRR' where R and R' are as defined above.

Similarly, the term "optionally substituted alkoxy" refers to the alkoxy group which is substituted with one, two, or three substituents independently selected from hydroxyl, alkoxy, carboxy, cyano, alkoxycarbonyl, alkylthio, alkylsulfonyl, halo, haloalkoxy, —CONRR' or —NRR' (where each R is hydrogen, alkyl, hydroxyalkyl, or alkoxyalkyl, and each R' is hydrogen, alkyl, or cycloalkyl) or heterocyclyl (preferably heterocycloamino) optionally substituted with one or two groups independently selected from alkyl, hydroxyl, alkoxy, alkylsulfonyl, halo, or —CONRR' where R and R' are as defined above.

Aspects of the present disclosure are directed to a cement paste composition, also referred to as the composition or composite. The present disclosure relates to materials and methods for enhancing the mechanical strength of a cement paste by incorporating ZIF-67 nanoparticles. The cement paste composition of the present disclosure exhibits low cost, and high durability, thereby circumventing drawbacks such as high manufacturing cost, and low strength of the prior art.

According to an aspect of the present disclosure, a cement paste composition is described. The composition includes a curable component including a cementitious material and a ZIF-67 present in an amount of 0.01 to 3%, preferably 0.1 to 2.9%, preferably 0.5 to 2.8%, preferably 1 to 2.7%, preferably 1.2 to 2.6%, or more preferably 1.5 to 2.5%, by weight based on a total weight of the cementitious material. The cementitious material includes at least one selected from the group consisting of portland cement, pozzolan cement, gypsum cement, aluminous cement, silica cement, and alkaline cement. The portland cement may include ordinary (type I), modified (type II), high-early-strength (type III), low-heat (type IV), and sulfate-resistant (type V) cements. In an embodiment, the cementitious material is type I ordinary portland cement (OPC). In some embodiments, the OPC has a standard specification of ASTM C150-21. In some other embodiments, the OPC has a standard specification of European EN-197. Other ranges are also possible.

As used herein, the term "portland cement" refers to the most common type of cement in general use developed from types of hydraulic lime and usually originating from limestone. It is a fine powder produced by heating materials in a kiln to form what is called clinker, grinding the clinker, and adding small amounts of other materials. The Portland cement is made by heating limestone (calcium carbonate) with other materials (such as clay) to >1400° C. This process in a kiln is also known as calcination, whereby a molecule of carbon dioxide is liberated from the calcium carbonate to form calcium oxide, or quicklime, which is then blended with the other materials that have been included in the mix to from calcium silicates and other cementitious compounds. The resulting hard substance, called "clinker" is then ground with a small amount of gypsum into a powder to make ordinary Portland cement (OPC). Several types of Portland cement are available with the most common being called ordinary Portland cement (OPC) which is grey in color.

In some embodiments, the portland cement has a composition by weight relative to the total weight of the cement of 50-55% ($C_3S$), 15-19% ($C_2S$), 4-10% ($C_3A$), 7-13% ($C_4AF$), 2-3% (MgO), 2-3% ($SO_3$), 3-4% ($Fe_2O_3$), 0. -0.8% ($Na_2Ox$), 17-23% ($SiO_2$), 4-6% ($Al_2O_3$), 60-66% (CaO), 1-3% ignition loss, and 0.5-1% insoluble residue. Other ranges are also possible.

In some embodiments, the ZIF-67 is present in the curable component of the cement paste composition in an amount of 0.05 to 1%, preferably 0.1 to 0.9%, preferably 0.2 to 0.8%, preferably 0.3 to 0.7%, preferably 0.4 to 0.6%, or more preferably, 0.5%, by weight based on the total weight of the cementitious material. In some further embodiments, the ZIF-67 particles have a mean particle size in a range of 5 to 150 nanometers (nm), preferably 10 to 130 nm, preferably 15 to 110 nm, preferably 20 to 90 nm, or more preferably 25 to 70 nm. In some further preferred embodiments, the ZIF-67 particles have a porous structure, and a mean pore size in a range of 0.5 to 5 nm, preferably 1 to 4.5 nm, preferably 2 to 4 nm, preferably 2.5 to 3.5 nm, or more preferably 3 nm. The ZIF-67 particles increase the compressive and direct tensile strength of the cement paste composition. As used herein, the term 'compressive strength' refers to the capacity of a material or structure to withstand loads tending to reduce size. Furthermore, "direct tensile strength" refers to the maximum stress a material can withstand while being stretched or pulled before breaking. Other ranges are also possible.

In some embodiments, the cement paste composition further includes water in an amount of 30 to 50%, more preferably, 35 to 45%, by weight based on the total weight of the cement paste composition. In some further embodiments, the water is at least one selected from the group consisting of tap water, groundwater, distilled water, deionized water, freshwater, and desalted water. In a preferred embodiment, the water is desalted water. The desalted water is present in the cement paste composition in an amount of 35 to 45%, more preferably, 38 to 43% by weight based on the total weight of the cement paste composition. Other ranges are also possible.

In an embodiment, the cement paste composition may include aggregates. As used herein, "aggregate" refers to a broad category of particulate material used in construction. Aggregates are a component of composite materials such as concrete; the aggregates serve as reinforcement to add strength to the overall composite material. Aggregates, from different sources, or produced by different methods, may differ considerably in particle shape, size and texture. Shape of the aggregates of the present disclosure may be cubical and reasonably regular, essentially rounded, angular, or irregular. Surface texture may range from relatively smooth with small exposed pores to irregular with small to large exposed pores. Particle shape and surface texture of both fine and coarse aggregates may influence proportioning of mixtures in such factors as workability, pumpability, fine-to-coarse aggregate ratio, and water requirement.

In one or more embodiments, the cement paste composition of the present disclosure may comprise a fine aggregate. In one embodiment, the fine aggregate used herein has an average particle size in a range of 0.05-1 mm, preferably 0.1-0.8 mm, preferably 0.2-0.6 mm, preferably 0.3-0.5 mm. In a preferred embodiment, the fine aggregate used herein has a specific gravity of 2.0-3.5, preferably 2.2-3.2, preferably 2.4-3.0, preferably 2.6-2.8. As used herein, water absorption refers to the penetration of water into aggregate particles with resulting increase in particle weight. In one embodiment, the cement paste composition of the present disclosure comprises a fine aggregate having a water absorption of 15 to 25%, more preferably, 18 to 23%, by weight based on a total weight of the cement paste composition after curing. Other ranges are also possible.

In a preferred embodiment, the fine aggregate is sand, more preferably dune sand. As used herein, "sand" refers to a naturally occurring granular material composed of finely divided rock and mineral particles. It is defined by size in being finer than gravel and coarser than silt. The composition of sand varies, depending on the local rock sources and conditions, but the most common constituent of sand is silica (silicon dioxide, or $SiO_2$), usually in the form of quartz. In terms of particle size, sand particles range in diameter from 0.0625 mm to 2 mm. An individual particle in this range is termed a sand grain. By definition sand grains are between gravel (particles ranging from 2 mm to 64 mm) and silt (particles ranging from 0.004 mm to 0.0625 mm). In a most preferred embodiment, the fine aggregate of the cement paste composition is dune sand with a specific gravity of 2.2-3.2, preferably 2.4-3.0, more preferably 2.5-2.7, or about 2.6.

In one or more embodiments, the cement paste composition of the present disclosure comprises a coarse aggregate. In one embodiment, the coarse aggregate used herein has an average particle size in a range of 2-20 mm, preferably 4-15 mm, preferably 6-13 mm, preferably 8-12 mm. In a preferred embodiment, the coarse aggregate used herein has a specific gravity of 2.0-3.0, preferably 2.2-2.9, preferably 2.4-2.8, preferably 2.5-2.7. In one embodiment, the cement paste composition of the present disclosure comprises a coarse aggregate having a water absorption of 15 to 25%, more preferably, 18 to 23%, by weight based on a total weight of the cement paste composition after curing. Other ranges are also possible.

In a preferred embodiment, the course aggregate present in the cement paste composition is crushed limestone. As used herein, limestone refers to a sedimentary rock composed largely of the minerals calcite and aragonite, which are different crystal forms of calcium carbonate ($CaCO_3$). Limestone is naturally occurring and can be found in skeletal fragments of marine organisms such as coral, forams, and molluscs. Crushed limestone is generated during the crushing and grinding of limestone rocks. The crushed limestone used herein may have an average particle size greater than 1 mm. In one embodiment, the crushed limestone has an average particle size of 1.5-32 mm, preferably 2-30 mm, preferably 4-28 mm, preferably 6-24 mm, preferably 8-20 mm, preferably 10-18 mm, preferably 12-16 mm. The crushed limestone may contain materials including, but not limited to, calcium carbonate, silicon dioxide, quartz, feldspar, clay minerals, pyrite, siderite, chert and other minerals. In a most preferred embodiment, the coarse aggregate of the cement paste composition is crushed limestone with a specific gravity of 2.1-3.0, preferably 2.2-2.8, more preferably 2.4-2.7, or about 2.56.

In an embodiment, the cement paste composition may include a surfactant. In a preferred embodiment, the surfactants may be a nonionic surfactant, an anionic surfactant, a cationic surfactant, a viscoelastic surfactant, or a zwitterionic surfactant. The surfactants may include, but are not limited to, ammonium lauryl sulfate, sodium lauryl sulfate (SLS), sodium dodecyl sulfate (SDS), alkyl-ether sulfates sodium laureth sulfate (sodium lauryl ether sulfate (SLES), sodium myreth sulfate, docusate (dioctyl sodium sulfosuccinate), perfluorooctanesulfonate (PFOS), perfluorobutanesulfonate, alkyl-aryl ether phosphates, alkyl ether phosphates, octenidine dihydrochloride; cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), CHAPS (3-[(3-cholamidopropyl)dimethylammonio]-1-propanesulfonate), cocamidopropyl hydroxysultaine, ocamidopropyl betaine, phospholipids, and sphingomyelins. In a preferred embodiment, the cement paste composition has a weight percentage of the surfactant ranging from 0.1-3.0% relative to the total weight of the composition, preferably 0.2-2.5%, preferably 0.5-2.0%, preferably 1.0-1.8%, preferably 1.2-1.6%, or about 1.5% relative to the total weight of the cement paste composition. Other ranges are also possible.

The surfactant may include primary and secondary emulsifiers. Hereinafter, the primary and secondary emulsifiers are collectively referred to as the "emulsifiers" or "surfactants" and individually referred to as the "emulsifier" or "surfactant," unless otherwise specified. The primary emulsifier is a polyaminated fatty acid. The primary emulsifier includes a lower hydrophilic-lyophilic balance (HLB) in comparison to the secondary emulsifier. The primary emulsifier may include, but are not limited to, span 60, span 85, span 65, span 40, and span 20. The primary emulsifier is sorbitan oleate, also referred to as the span 80. The secondary emulsifier may include, but are not limited to triton X-100, Tween™ 80, Tween™ 20, Tween™ 40, Tween™ 60, Tween™ 85, OP4 and OP 7. The secondary emulsifier includes a biosurfactant such as a rhamnolipid surfactant. In an embodiment, the surfactant may be neopelex or stearic acid.

The cement paste composition may further include a defoaming agent. As used herein, the term "deforming agent" refers to the chemical additive that reduces and hinders foam formation in industrial process liquids. The deforming agent may include, but are not limited to, 2-octanol, oleic acid, paraffinic waxes, amide waxes, sulfonated oils, organic phosphates, silicone oils, mineral oils, and dimethylpolysiloxane. The defoaming agent may be dimethyl silicone polymer or polyoxy propylene glycerin ether. In a preferred embodiment, the cement paste composition has a weight percentage of the defoaming agent ranging from 0.01-1.0% relative to the total weight of the composition, preferably 0.02-0.8%, preferably 0.03-0.6%, preferably 0.04-0.4%, preferably 0.05-0.2%, or about 0.1% relative to the total weight of the cement paste composition.

The cement paste composition may also include a plasticizer. As used herein, a "plasticizer" is an additive that increases the plasticity or fluidity of slurry. Plasticizers increase the workability of "fresh" cement composition, allowing it to be placed more easily, with less consolidating effort. A superplasticizer is a plasticizer with fewer deleterious effects. A "superplasticizer" refers a chemical admixture used herein to provide a well-dispersed particle suspension in the wet cement composition. The superplasticizer may be used to prevent particle segregation and to improve the flow characteristics of the wet cement composition. The superplasticizer may be a polycarboxylate, e.g. a polycarboxylate derivative with polyethylene oxide side chains, a polycarboxylate ether (PCE) superplasticizer, such as the commercially available Glenium 51R®. Polycarboxylate ether-based superplasticizers may allow a significant water reduction at a relatively low dosage, thereby providing good particle dispersion in the wet concrete slurry. Polycarboxylate ether-based superplasticizers are composed of a methoxy-polyethylene glycol copolymer (side chain) grafted with methacrylic acid copolymer (main chain). Exemplary superplasticizers that may be used in addition to, or in lieu of a polycarboxylate ether based superplasticizer include, but are not limited to, alkyl citrates, sulfonated naphthalene, sulfonated alene, sulfonated melamine, lignosulfonates, calcium lignosulfonate, naphthalene lignosulfonate, polynaphthalenesulfonates, formaldehyde, sulfonated naphthalene formaldehyde condensate, acetone formaldehyde condensate, polymelaminesulfonates, sulfonated melamine formaldehyde condensate, polycarbonate, other polycarboxylates, other polycarboxylate derivatives comprising polyethylene oxide side chains, and the like and mixtures thereof. In a preferred embodiment, the cement paste composition has a weight percentage of the plasticizer ranging from 0.1-3.0% relative to the total weight of the composition, preferably 0.2-2.5%, preferably 0.5-2.0%, preferably 1.0-1.8%, preferably 1.2-1.6%, or about 1.5% relative to the total weight of the cement paste composition. Other ranges are also possible.

In some embodiments, the cement paste composition is basic or alkaline having a pH of at least 11, due to the presence of calcium hydroxide, e.g. a pH of from 11 to 14, such as a pH of 11 to 13, e.g. a pH of 12.5 to 13. Such a composition tends to react with, or have an affinity for, base-reactive surfaces and consequently have a decided tendency to cling, binder react to these surfaces.

In some embodiments, the cement paste composition may be transferred to 25 mm×25 mm cubic brass molds, specified by ASTM C109/C109M-21. Samples are cured at a humidity (RH) of at least 90%, at least 92%, at least 94%, or at least 96%, at a temperature in a range of 15 to 40° C., preferably 18 to 30° C., 20 to 25° C. The samples are then demolded and cured for 7 days, 14 days, and 28 days, and further stored at least 90% RH, and a temperature of 18 to 25° C., until mechanically loaded. The samples are mechanically loaded at 200 lb/s on an ELE load frame (Accu-Tek Touch 250 Series) in accordance with ASTM C109/C109M-21. In some further embodiment, a cured specimen made from the cement paste composition has a compressive strength of 30 to 80 megapascal (MPa), preferably 35 to 75 MPa, preferably 40 to 70 MPa, preferably 45 to 65 MPa, or more preferably 50 to 60 MPa, according to ASTM C109/C109M-21 standard test method. Other ranges are also possible.

Figure 3:
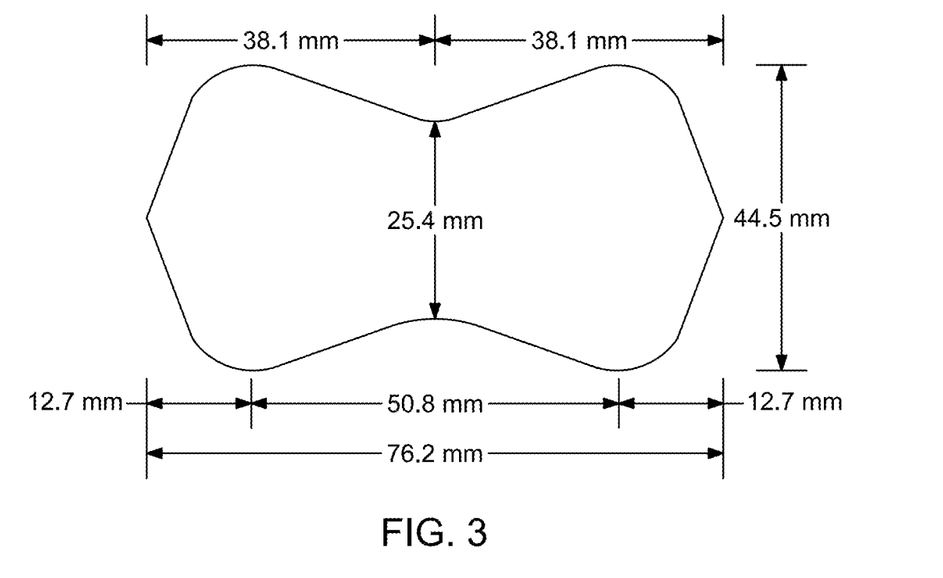
FIG. 3 is a schematic drawing of a plan of briquette molds, according to certain embodiments of the present disclosure.

In some embodiments, the cement paste composition may be transferred to a mold having a dimension of 75 mm long, 25 mm thick, and a minimum cross-section of 645 mm$^2$, as depicted in FIG. 3 and specified by ASTM C307-18. Samples are cured at a humidity (RH) of at least 90%, at least 92%, at least 94%, or at least 96%, at a temperature in a range of 15 to 40° C., preferably 18 to 30° C., 20 to 25° C. The samples are then demolded and cured for 28 days, and further stored at least 90% RH, and a temperature of 18 to 25° C., until mechanically loaded. The samples are tested in accordance with ASTM C307-18. In some further embodiment, the cured specimen has a direct tensile strength of 1.2 to 2.2 MPa, preferably 1.4 to 2 MPa, or more preferably 1.6 to 1.8 MPa, according to ASTM C307-18 standard test method. Other ranges are also possible.

In some embodiments, the ZIF-67 particles are uniformly distributed throughout the cured specimen. In some preferred embodiments, the compressive strength of the cured specimen made from the cement paste composition is 40 to 50%, more preferably, 42 to 48%, greater than that of a cured specimen made from a cement paste composition without the ZIF-67 as determined by ASTM C109/C109M-21. In some further preferred embodiments, the direct tensile strength of the cured specimen made from the cement paste composition is 100 to 120%, 105 to 115%, greater than that of a cured specimen made from a cement paste composition without the presence of ZIF-67 as determined by ASTM C307-18. Other ranges are also possible.

A cement specimen includes the cement paste composition in a cured form. In some embodiments, a weight ratio of the water to the curable component is in a range of 0.3:1 to 0.5:1, more preferably, 0.35 to 0.8 to 0.48 to 0.5. In some preferred embodiments, the cement specimen has a water absorption of 15 to 25%, more preferably, 18 to 23%, by weight based on a total weight of the cement paste composition after curing. As used herein, the term "water absorption" refers to the ratio of the weight of water absorbed to the weight of the dry material. As used herein, the term "dry density" refers to the ratio of total dry mass of soil to the total volume of soil. In some further preferred embodiments, the cement specimen has a dry density of 1.55 to 1.80 gram per cubic meter (g/cm$^3$), more preferably, 1.65 to 1.75 g/cm$^3$, after curing.

Figure 9:
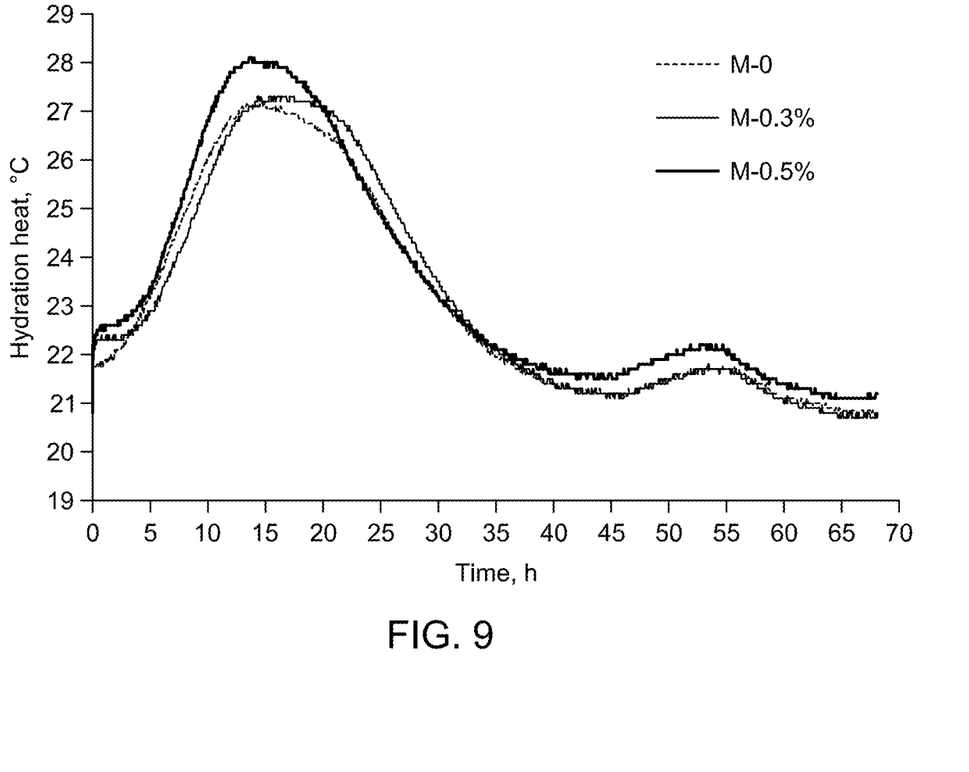
FIG. 9 is a graph depicting the heat of hydration of various cement paste compositions, according to certain embodiments of the present disclosure.

Referring to FIG. 9, the heat of hydration of various cement paste compositions are evaluated by isothermal calorimetry test according to ASTM C1679-17. The isothermal calorimetry test is used to monitor heat flow rate over time (also referred to as power vs. time), which describes the rate of cement hydration, or in the form of heat of hydration over time, which is the integrated heat flow rate (also referred to as energy vs. time). In some more preferred embodiments, the cement specimen has a higher degree of hydration than that of a cement paste made from the same composition but without the ZIF-67 according to ASTM C1679-17 standard test method. As used herein, the term "degree of hydration" is directly proportional to the amount of chemically bound water. The cement specimen has a plurality of calcium silicate hydrates. In some even more preferred embodiments, the calcium silicate hydrate has a layered structure with a basal spacing of 5 to 20 angstroms (Å), more preferably, 10 to 15 Å and a sheet-like morphology. Other ranges are also possible.

The International Union of Pure and Applied Chemistry (IUPAC) states that a metal organic framework (MOF) is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and finally a coordination polymer is a coordination compound with repeating coordination entities extending in one, two, or three dimensions. A coordination entity is an ion or neutral molecule that is composed of a central atom, usually that of a metal, to which is attached a surrounding array of atoms or groups of atoms, each of which is called ligands. More succinctly, a metal organic framework is characterized by metal ions or clusters coordinated to organic ligands to form one-, two-, or three-dimensional structures. Typically, a MOF exhibits a regular void or pore structure. The nature of the void or pore structure, including properties or structural factors such as the geometry about the metal ions or clusters, the arrangement of the linkages between metal ions or clusters, and the number, identity, and spatial arrangement of voids or pores. These properties may be described as the structure of the repeat units and the nature of the arrangement of the repeat units. The specific structure of the MOF, which may include the void or pore structure is typically referred to as the MOF topology.

The metal-organic framework comprises a metal ion which is an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, these metal ions may be of any oxidation state $M^{+1}$, $M^{+2}$, $M^{+3}$, etc. In one or more embodiments, the metal ion is an ion of at least one metal selected from the group consisting of Zn, Cu, Fe, Ni, Co, Mn, Cr, Cd, Mg, Ca, and Zr.

In the formation of a metal organic framework, the organic ligands must meet certain requirements to form coordination bonds, primarily being multi-dentate, having at least two donor atoms (i.e., N—, and/or O—) and being neutral or anionic. The structure of the metal organic frame- work is also affected by the shape, length, and functional groups present in the organic linker. In certain embodiments, the metal organic framework of the present disclosure comprises anionic ligands as organic ligands. In one or more embodiments, the organic ligands may have at least two nitrogen donor atoms. For example, the organic ligands may be imidazolate-based, imidazole-derived or ligands similar to an imidazole including, but not limited to, optionally substituted imidazoles, optionally substituted benzimidazoles, optionally substituted imidazolines, optionally substituted pyrazoles, optionally substituted thiazoles, and optionally substituted triazoles. In a preferred embodiment, the metal organic framework of the present disclosure in any of its embodiments comprises 2-methylimidazole and 5-methylbenzimidazole as the organic ligands. 2-Methylimidazole and 5-methylbenzimidazole organic ligands have free nitrogen atoms that may each form a coordinative bond to the metal ions (e.g. Co(II)) to produce a coordination network.

Metal organic frameworks comprising such imidazole or benzimidazole ligands are typically referred to as zeolitic imidazolate frameworks (ZIFs). In some embodiments, the metal organic framework is a zeolitic imidazolate framework. Examples of suitable metal organic frameworks include, but are not limited to isoreticular metal organic framework-3 (IRMOF-3), MOF-69A, MOF-69B, MOF-69C, MOF-70, MOF-71, MOF-73, MOF-74, MOF-75, MOF-76, MOF-77, MOF-78, MOF-79, MOF-80, DMOF-1-NH2, UMCM-1-NH2, MOF-69-80, ZIF-1, ZIF-2, ZIF-3, ZIF-4, ZIF-5, ZIF-6, ZIF-7, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-670, ZIF-671, ZIF-672, ZIF-90, ZIF-91, ZIF-92, ZIF-93, ZIF-94, ZIF-96, ZIF-97, ZIF-100, ZIF-108, ZIF-303, ZIF-360, ZIF-365, ZIF-376, ZIF-386, ZIF-408, ZIF-410, ZIF-412, ZIF-413, ZIF-414, ZIF-486, ZIF-516, ZIF-586, ZIF-615, and ZIF-725.

Figure 1:
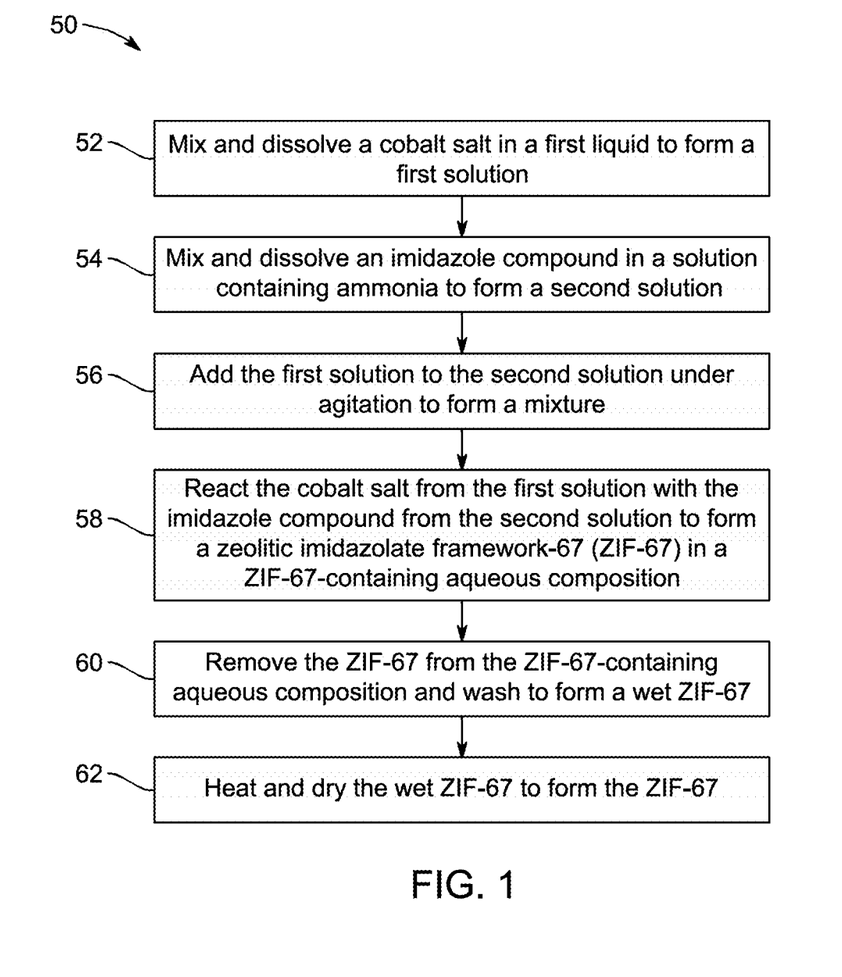
FIG. 1 is a schematic flow diagram of a method of making a zeolitic imidazolate framework-67 (ZIF-67), according to certain embodiments of the present disclosure.

FIG. 1 shows a schematic flow diagram of a method 50 of making the ZIF-67. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing and dissolving a cobalt salt in a first liquid to form a first solution. In some embodiments, the cobalt salt is at least one selected from the group consisting of cobalt sulfate, cobalt acetate, cobalt citrate, cobalt iodide, cobalt chloride, cobalt perchlorate, cobalt nitrate, cobalt phosphate, cobalt triflate, cobalt bis(trifluoromethanesulfonyl)imide, cobalt tetrafluoroborate, cobalt bromide, and/or its hydrate. In an embodiment, the cobalt salt is cobalt nitrate hexahydrate. The first liquid may include tap water, ground water, distilled water, deionized water, fresh water, and desalted water. In an embodiment, the first liquid is the distilled water. In a preferred embodiment, the cobalt nitrate hexahydrate is mixed and dissolved in a specific volume of the distilled water to form a cobalt nitrate hexahydrate solution (as the first solution). The cobalt nitrate hexahydrate solution has molarity in a range of about 20 to 100 mM, preferably 30 to 80 mM, preferably 40 to 60 mM, or more preferably 50 mM. Other ranges are also possible.

At step 54, the method 50 includes mixing and dissolving an imidazole compound in a solution including ammonia to form a second solution. In some embodiments, the imidazole compound includes an imidazole of formula (I) and a benzimidazole of formula (II):

Where $R_1$, $R_2$, $R_3$, $R_4$, $R_5$, $R_6$, $R_7$, and $R_8$ are each independently selected from the group consisting of hydrogen, an optionally substituted alkyl, an optionally substituted cycloalkyl, an optionally substituted alkoxy, a hydroxyl, a halogen, a nitro, and a cyano.

Exemplary imidazole-based ligands that may be applicable to the current disclosure include, but are not limited to, imidazole, 2-methylimidazole, 4-methylimidazole, 2-ethylimidazole, 2-isopropylimidazole, 4-tert-butyl-1H-imidazole, 2-ethyl-4-methylimidazole, 2-bromo-1H-imidazole, 4-bromo-1H-imidazole, 2-chloro-1H-imidazole, 2-iodoimidazole, 2-nitroimidazole, 4-nitroimidazole, (1H-imidazol-2-yl)methanol, 4-(hydroxymethyl)imidazole, 2-aminoimidazole, 4-(trifluoromethyl)-1H-imidazole, 4-cyanoimidazole, 3H-imidazole-4-carboxylic acid, 4-imidazolecarboxylic acid, imidazole-2-carboxylic acid, 2-hydroxy-1H-imidazole-4-carboxylic acid, 4,5-imidazoledicarboxylic acid, 5-iodo-2-methyl-1H-imidazole, 2-methyl-4-nitroimidazole, 2-(aminomethyl)imidazole, 4,5-dicyanoimidazole, 4-imidazoleacetic acid, 4-methyl-5-imidazolemethanol, 1-(4-methyl-1H-imidazol-5-yl)methanamine, 4-imidazoleacrylic acid, 5-bromo-2-propyl-1H-imidazole, ethyl-(1H-imidazol-2-ylmethyl)-amine, and 2-butyl-5-hydroxymethylimidazole. In preferred embodiments, the imidazole of formula (I) is 2-methylimidazole.

Exemplary benzimidazole-based ligands that may be applicable to the current disclosure include, but are not limited to, benzimidazole, 5-methylbenzimidazole, 2-methylbenzimidazole, 5-chlorobenzimidazole, 5-bromobenzimidazole, 5,6-dimethylbenzimidazole, 5-methoxybenzimidazole, 2-chlorobenzimidazole, 2-bromo-1H-benzimidazole, 6-bromo-1H-benzimidazole, 5-fluoro-1H-benzimidazole, 5-chloro-2-methylbenzimidazole, methyl benzimidazole-2-acetate, 1H-benzoimidazol-4-ol, 1H-benzimidazol-5-yl-methanol, 2-benzimidazolemethanol, 4-chloro-6-(trifluoromethyl)benzimidazole, 5-chloro-2-(trichloromethyl)benzimidazole, 5-cyanobenzimidazole, (2-benzimidazolyl)acetonitrile, (5-chloro-1H-benzimidazol-2-yl)methanol, 2-(chloromethyl)benzimidazole, 5-iodo-2-methylbenzimidazole, (5-chloro-1H-benzimidazol-2-yl)methylamine, 2-(aminomethyl)benzimidazole, 2-(6-chloro-1H-benzimidazol-2-yl)ethanol, 2-(1H-benzoimidazol-2-yl)-acetamide, (6-methoxy-1H-benzimidazol-2-yl)methanol, 5,6-dimethoxybenzimidazole, 2-(1H-benzoimidazol-2-yl)-ethylamine, 1-(5-methyl-1H-benzimidazol-2-yl)methanamine, 1-(5-methyl-1H-benzimidazol-2-yl)ethanamine, 2-benzimidazolepropionic acid, 2-(5-methyl-1H-benzimidazol-2-yl)ethanamine, 2-(3-hydroxy-N-propyl)-5-(trifluoromethyl)-benzimidazole, and N-methyl-1-(5-methyl-1H-benzimidazol-2-yl)methanamine. In preferred embodiments, the benzimidazole of formula (II) is 5-methylbenzimidazole.

In a preferred embodiment, the imidazole compound is 2-methylimidazole (2-MIM). In an embodiment, a desired mass of the 2-MIM can be dissolved in 20 to 30%, more preferably, 25% solution including the ammonia to form the 2-MIM solution (as the second solution). In another embodiment, the 2-MIM is present in the second solution at a concentration of 50 to 500 mM, preferably 100 to 400 Mm, preferably 150 to 300 mM, or more preferably about 200 mM. Other ranges are also possible.

At step 56, the method 50 includes adding the first solution to the second solution under agitation to form a mixture. In some embodiments, the mixture can be obtained by stirring at room temperature (RT) for about 0.5 to 4 hours, preferably 0.7 to 3 hours, preferably 0.9 to 2 hours, or more preferably 1 hour. In some embodiments, a molar ratio of the cobalt salt to the imidazole compound present in the mixture is in a range of 1:2 to 1:6, preferably 1:2.5 to 1:5.5, preferably 1:3 to 1:5, preferably 1:3.5 to 1:4.5, or more preferably about 1:4. Other ranges are also possible.

At step 58, the method 50 includes reacting the cobalt salt from the first solution with the imidazole compound from the second solution to form the ZIF-67 in a ZIF-67-containing aqueous composition. Multiple types of the ZIF particles may be formed, which differ in various properties such as identity of composition of the ZIF, size, shape, or other similar property. In general, the ZIF particles may have any suitable shape, and may be uniform or non-uniform. In some embodiments, the ZIF has a delaminated structure comprising charged crystalline particles. In one or more embodiments, a distance between laminated layers is in a range of 0.5 to 100 nm, preferably 1 to 50 nm, preferably 3 to 40 nm, preferably 5 to 30 nm, preferably 7 to 20 nm, or even more preferably 9 to 15 nm. Other ranges are also possible.

At step 60, the method 50 includes removing the ZIF-67 from the ZIF-67-containing aqueous composition and washing it to form a wet ZIF-67. In some embodiments, the ZIF-67 can be collected by centrifugation for 25 to 35 minutes, more preferably 30 minutes, at 75000 to 8200 rotations per minute (rpm), more preferably 8000 rpm. In some preferred embodiments, the ZIF-67 can be washed several times with the distilled water for 25 to 35 minutes as per cycle. Other ranges are also possible.

At step 62, the method 50 includes heating and drying the wet ZIF-67 to form the ZIF-67. In an embodiment, the heating and drying of the wet ZIF-67 can be performed in a source selected from the group consisting of an oven, an autoclave and an evaporator. The wet ZIF-67 can be dried in a range of 35 to 95° C., preferably 45 to 85° C., preferably 55 to 65° C., or more preferably 60° C. Other ranges are also possible.

According to a preferred embodiment of the present disclosure, a method of producing the cement specimen is provided. The method includes casting the cement paste composition in a mold to form a casted cement paste. In an embodiment, the casting may be substituted by an extrusion molding, a blow molding, an injection molding, and a rotational molding. In an embodiment, the mold is a briquette mold. The mold may be made up of a material selected from a group of any alloy or metal such as stainless steel, bronze, and nichrome. The mold may include, but are not limited to shapes such as spherical, cylindrical, cubical, cuboidal, pentagonal, hexagonal, and rhombic. The method further includes curing the casted cement paste for 0.5-30 days, more preferably, 7-28 days, thereby forming the cement specimen.

EXAMPLES

The following examples describe and demonstrate exemplary embodiments of the cement paste composition described herein. The examples are provided solely for the purpose of illustration and are not to be construed as limitations of the present disclosure, as many variations thereof are possible without departing from the spirit and scope of the present disclosure.

Materials and Methods

Example 1: Materials

The cementitious material used in the study is type I OPC, which corresponds to the requirements of ASTM C150-21 and has chemical oxides components and physical parameters listed in Table 1. 2-methylimidazole (99% pure) and cobalt nitrate hexahydrate (99% pure) were utilized in the preparation of the ZIF-67 nanoparticles.

TABLE 1

| Chemical compounds and physical properties of OPC | | | | | | | | | | | | |
|---|---|---|---|---|---|---|---|---|---|---|---|---|
| CaO | $Al_2O_3$ | $SiO_2$ | $SO_3$ | MgO | $Fe_2O_3$ | $Na_2O_{eq}$ | $C_3S$ | $C_2S$ | $C_3A$ | $C_3AF$ | LOI | IR |
| 63.2 | 4.9 | 20.5 | 2.5 | 2.0 | 3.5 | 0.5 | 53.6 | 17.4 | 6.9 | 10.0 | 2.4 | 0.8 |

Note:
LOI = Loss On Ignition (%) &
IR = Insoluble Residue &
$Na_2O_{eq}$ = % $Na_2O$ + 0.658 × % $K_2O$

Example 2: Synthesis of ZIF-67 Nanoparticles

ZIF-67 was synthesized starting from cobalt nitrate hexahydrate and 2-MIM as precursors. Cobalt nitrate hexahydrate solution (50 millimolars (mM)) was prepared by dissolving an appropriate amount of the cobalt nitrate hexahydrate in a specific volume of distilled water. 2-MIM solution (200 mM) was prepared by dissolving the desired mass of 2-MIM in 25% ammonia solution. The volumes of both solutions were approximately the same. Then, the cobalt nitrate hexahydrate solution was added quickly to the 2-MIM solution under vigorous stirring at RT. Upon the completion of the cobalt nitrate hexahydrate solution addition, the vigorous stirring of the reaction mixture was continued for 1 hour to ensure the completion of the reaction. After that, the formed ZIF-67 was kept standing for an additional 1 hour. Then, the ZIF-67 was collected by centrifugation for 30 minutes at 8000 rpm. To remove the unreacted precursors, the synthetic ZIF-67 was washed several times with distilled water (30 minutes each cycle). Then, the purified ZIF-67 was dried at 60° C.

Example 3: Cement Paste-ZIF-67 Mixing Procedure

Mix proportion of the composite, cement paste-ZIF-67, is shown in Table 2. A water-to-cement ratio of 0.4 for all mixtures was used. The ZIF-67 with 0, 0.1, 0.3, 0.5, 0.7, and 0.9% by weight of Portland cement were added to the paste. The desired mix proportion would be chosen considering compressive and bending strength.

Figure 2:
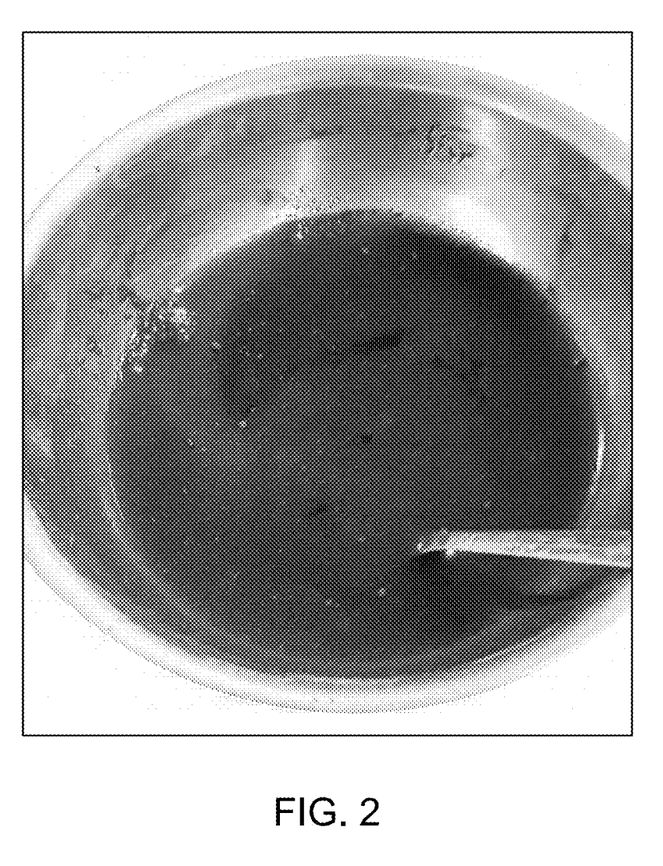
FIG. 2 is an exemplary drawing of a ZIF-67 solution, according to certain embodiments of the present disclosure.

The ZIF-67 solution (FIG. 2) was made by dispersing the ZIF-67 with a weighed mass into desalted water and then adding the cement to the ZIF-67 solution. Then, the ZIF-67 solution was stirred for 3-4 minutes to ensure homogeneity. The composite was then poured into molds to form specimens. After 24 hours of casting, the specimens were demolded, and water was cured for 7 and 28 days.

TABLE 2

The mix proportion of cement paste-ZIF-67

| | | Quantities, kg/m³ | | |
| --- | --- | --- | --- | --- |
| Mix ID | ZIF-67 particles, % | OPC | ZIF-67 particles | Water |
| M-0 | 0 | 2203.2 | 0 | 881.3 |
| M-0.1 | 0.1 | 2201 | 2.2 | 881.3 |
| M-0.3 | 0.3 | 2194.4 | 6.6 | 881.3 |
| M-0.5 | 0.5 | 2183.4 | 11 | 881.3 |
| M-0.7 | 0.7 | 2167.9 | 15.4 | 881.3 |
| M-0.9 | 0.9 | 2148.1 | 19.8 | 881.3 |

Testing Procedure of Cement Paste-ZIF-67

Example 4: Compressive Strength

The compressive strength was conducted following ASTM C109/C109M-21. Three of 25 mm cubical specimens, for each mixture, were prepared, cured at standard curing conditions (relative humidity≥90%, Temperature=21±2° C.) and tested for compressive strength at 7 days and 28 days of curing age.

Example 5: Direct Tensile Strength

The specimens for tensile strength experiments were prepared using briquette moulds. Briquette specimen has a dimension of 75 millimetres (mm) long, 25 mm thick, and a minimum cross-section of 645-millimetre square (mm²) where failure occurs (FIG. 3). Three briquette specimens for each mixture were casted and cured for 28 days. The tensile strength tests were then conducted according to ASTM C307-18 and the maximum load at failure was recorded by a testing machine. The ultimate tensile strength was calculated by dividing maximum load at failure over cross-sectional area, at a central portion.

Example 6: Water Absorption and Dry Density Test

Prior to compression tests, hardened dry density of the cement paste-ZIF-67 was determined by weighing three specimens from each mixture on the testing day. Immersed weight ($W_i$) and saturated weight ($W_s$) were determined by weighting the specimen while suspended by metal wire and totally submerged in water at RT (not more than 26.7° C.) and recorded $W_i$. Then, the specimen was removed from water and allowed the water to drain by placing the specimen on a wire mesh for 1 minute. Then the visible water on the surface was removed with a tissue, then weight and record $W_s$. The specimens were left to dry for 24 hours in a ventilated oven at 100-115° C. and then the weight of the dried specimens was measured and recorded ($W_d$). Finally, density of the specimens was calculated by equation (1). Water absorption was also measured from the difference in the specimen weight before and at the end of specified testing periods as per equation (2). The density and water absorption were measured at 7 days and 28 days of curing age.

$$D(g/cm^3) = \frac{W_d}{W_s - W_i} \quad (1)$$

$$WA(\%) = \frac{W_s - W_d}{W_d} \times 100 \quad (2)$$

Example 7: Isothermal Calorimetry Test

Figure 4:
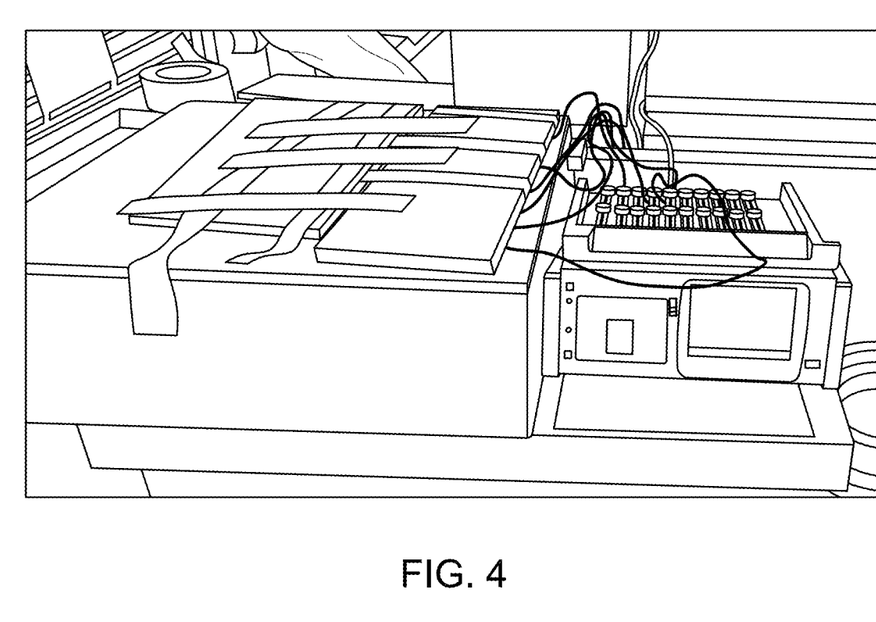
FIG. 4 is a schematic drawing of an isothermal calorimeter apparatus used for measuring hydration heat of cement paste compositions, according to certain embodiments of the present disclosure.

The hydration heat of the cement paste-ZIF-67 mixtures was measured using an isothermal calorimetry apparatus and procedures as described in ASTM C1679-17. 100 grams (g) of fresh paste, for each mixture, with a 0.4 water to cement ratio were mixed and poured into an isolated plastic vial (60 milliliters (ml)) and immediately placed into a calorimeter which is made of polystyrene (non-reactive material) as shown in FIG. 4. Elapsed time from an initial contact between the OPC and the ZIF-67 solution was measured through thermocouples connected to data acquisition system for 3 days at RT (21° C.±2° C.). The effect of the ZIF-67 on the hydration rate of the OPC over time was examined. Two calorimetry tests for each mixture were carried out following the same procedure. The two replicates produced similar calorimetry profiles, with a percentage variation of less than 4%. The average results of the heat flow over time were plotted.

Results and Discussions

Example 8: Compressive Strength

Figure 5:
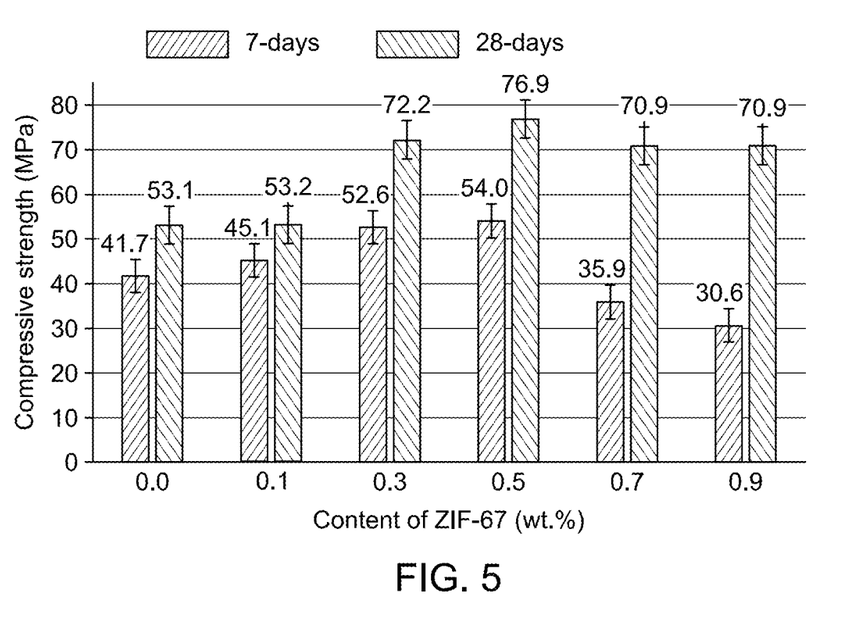
FIG. 5 is a graph depicting the effect of the weight percentage of ZIF-67 on the compressive strength of the cement paste composition, according to certain embodiments of the present disclosure.

FIG. 5 shows the compressive strength at 7 and 28 days of the cement paste with varying ZIF-67 content (0.1-0.9%) compared to the control cement paste. The ZIF-67 nanoparticles significantly improved the compressive strength of the cement paste as the ZIF-67 content increased up to 0.5%; after that, the compressive strength declined as the ZIF-67 content increased beyond 0.5%. Such behaviour can be attributed to a moderate concentration of the ZIF-67, which can expedite the hydration reaction of cement and fill micropores generated during a hardening process, resulting in a densified cement structure. However, excessive content of the ZIF-67 has an adverse influence on the strength of the cement.

With the ZIF-67 content ranging from 0.1 to 0.9%, an improvement effect of the ZIF-67 was increased as the curing age was raised (from 7 days to 28 days), while the inclusion of the ZIF-67 nanoparticles accelerated the strength development of the cement paste at an early age of curing and dramatically increases the strength development at a later age. A significant increase in the compressive strength caused by the addition of the ZIF-67 at the later stage of the curing is attributable to the fact that the ZIF-67 has little effect on the hydration reaction of $C_3A$ and $C_3S$ while having a greater effect on $C_2S$. The 28 days compressive strength was 0.2%, 36.1%, 44.8%, 33.7%, and 33.6% with the ZIF-67 content ranging from 0.1 to 0.9%. As a result, the desired ZIF-67 concentration was 0.5%, which resulted in the compressive strength of 54.0 and 76.9 MPa at 7 and 28 days, which means the compressive strength increased by 29.4% and 44.8% at 7 and 28 days of curing, respectively, compared to the control cement paste.

Example 9: Direct Tensile Strength

Figure 6:
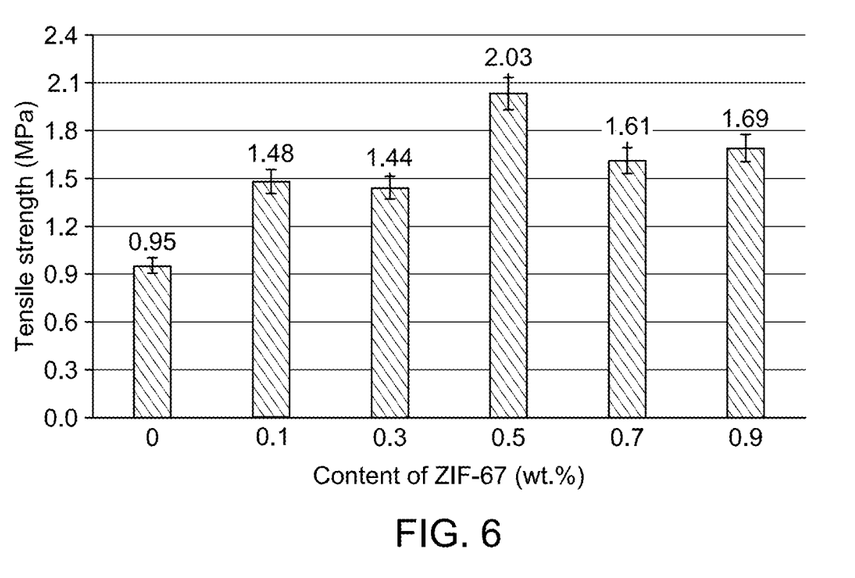
FIG. 6 is a graph depicting the effect of the weight percentage of ZIF-67 on the direct tensile strength test of the cement paste composition, according to certain embodiments of the present disclosure.

The direct tensile strength of the cement paste-ZIF-67 mixtures was also tested and the results of the six mixtures are presented in FIG. 6 under 28 days of water curing. As shown in FIG. 6, the tensile strength of the cement paste-ZIF-67 (composite) is comparable to the control samples. The mixes containing the ZIF-67 had an increase in the tensile strength of 55.3%, 51.2%, 113%, 69.1%, and 77.2% when the ZIF-67 contents were 0.1%, 0.3%, 0.5%, 0.7%, and 0.9%, respectively. However, the enhancement effect started to reduce as the content of the ZIF-67 exceeds 0.5%. The increase in the direct tensile strength is attributed to the rapid consumption of calcium hydroxide $(Ca(OH)_2)$ generated during the cement hydration due to the high reactivity of the ZIF-67 nanoparticles. As a result, the cement hydration is expedited, resulting in higher amounts of reaction products. Furthermore, the ZIF-67 nanoparticles re-establish the particle packing density of blended cement, resulting in a smaller volume of larger pores in the cement paste. This demonstrates that the ZIF-67 nanoparticles were mostly well dispersed and distributed in the cement paste and capable of synthesizing hydration cement products. Additionally, compared to specimens without the ZIF-67, bridging of microcracks by the ZIF-67 nanoparticles may have prolonged specimen fracturing and considerably improved the strength.

Example 10: Water Absorption

Figure 7:
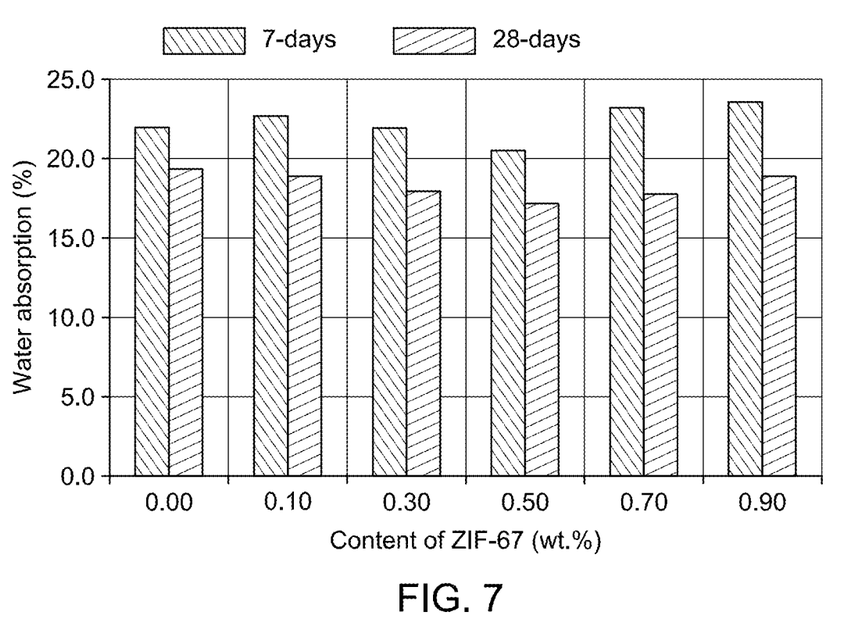
FIG. 7 is a graph depicting the effect of the weight percentage of ZIF-67 on the water absorption of the cement paste composition, according to certain embodiments of the present disclosure.

FIG. 7 shows the water absorption of the cement paste-ZIF-67 composite. A reduction in the water absorption of the composite is observed with the addition of nanoparticles at higher curing age (28 days) with the most significant reduction at the inclusion of 0.5 wt. %. The maximum water absorption was recorded to be 17.18% when 0.5 wt. % of the ZIF-67 was added which is 11.2% lower than the water absorption of the control mix. This is due to the reactivity of the ZIF-67 nanoparticles with $Ca(OH)_2$, which densifies matrix and makes water penetration harder.

Example 11: Dry Density

Figure 8:
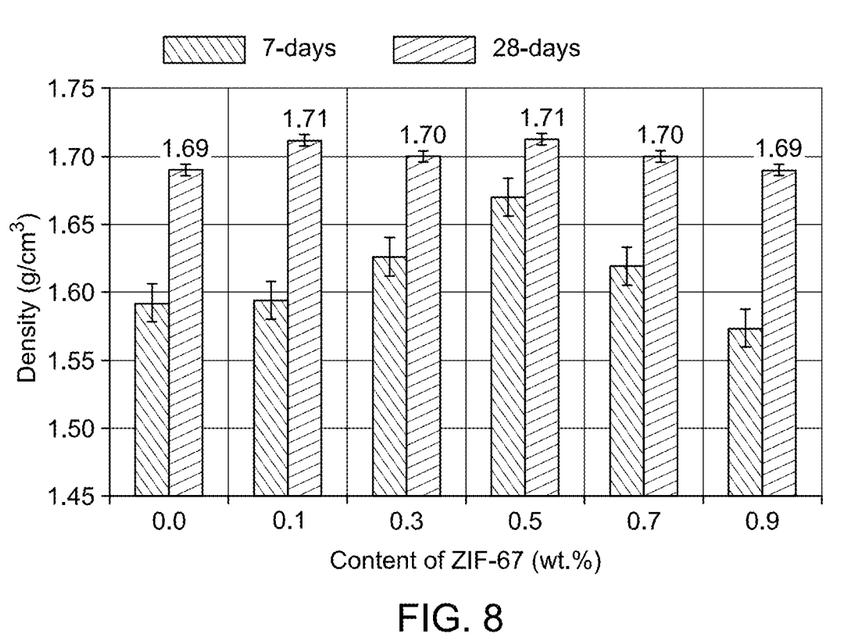
FIG. 8 is a graph depicting the effect of the weight percentage of ZIF-67 on the density of the cement paste composition, according to certain embodiments of the present disclosure.

FIG. 8 shows the densities of the cement paste-ZIF-67 mixtures. The density of the composites increased significantly with age, reaching a maximum density, at 28 days, of 1.71 g/cm3 at the ZIF-67 content of 0.5 wt. %. This is attributed to the fact that the addition of the ZIF-67 to the cement paste reduced both the number and size of pores. As the ZIF-67 concentration increased, the number of gel pores increased, while porosity decreased, indicating that the amount of C-S-H gel increased. As a result, the ZIF-67 nanoparticles operate as a filler, filling the pores generated during the hydration reaction and resulting in a densified structure. However, when the content of the ZIF-67 was greater than 0.5 wt. %, it has a negative influence on the pore structure of the cement paste, resulting in reduced drying density.

Example 12: Isothermal Calorimetry

The effect of the ZIF-67 nanoparticles on the hydration rate of the cement paste was examined using heat flow measurement obtained from an isothermal calorimeter apparatus. FIG. 9 illustrates incremental and cumulative heat flow curves of control specimens (cement past only) and ZIF-67 cement paste specimens (0.3 and 0.5 wt. %). The addition of the ZIF-67 nanoparticles increased the early hydration rate at the first 1 hour and then significantly increases hydration peak during acceleration and deceleration periods. That means there is a rapid reaction between $C_3S$ and ZIF-67 solution in the first seconds immediately after wetting accompanied by the release of heat (exothermic reaction) however, dissolution of $C_3S$, after approximately 16 hours, also releases a large amount of heat compared to the control mix. The maximum peak of hydration was 28° C. at 16.5 hours which was attained for the ZIF-67 cement having 0.5% of the ZIF-67 nanoparticles. The higher hydration rate indicates that more hydration products were formed during the early age in which the total heat released was also increased. Based on such findings, it may be concluded that ZIF-67 cement has a higher degree of hydration at earlier ages. Moreover, because the growth of the C-S-H is governing factor for the acceleration period, and due to the current findings, it can be claimed that more the C-S-H is created in the ZIF-67 cement. Consequently, the addition of the ZIF-67 nanoparticles helps in growing further regions of the precipitation of the C-S-H and induces growth of new regions of C-S-H gel.

The addition of the ZIF-67 nanoparticles has a clear influence on the hydration acceleration, increasing the maximum heat flow while decreasing the time to reach silicate and aluminate reaction peaks as shown in FIG. 9. Finally, it is also noticed that the hydration kinetics of THE cement paste-ZIF-67 composite followed typical trends of the control cement paste.

The present disclosure provides the cement paste composition which exhibits high compressive strength at the early age of the curing (29.4% enhancement at 7 days with ZIF-67 content of 0.5 wt. %) while reveals a dramatic increase of the compressive strength at 28 days (44.8% enhancement with the inclusion of 0.5 wt. % ZIF-67) compared to the control mix. The direct tensile tests showed an improvement of 113% in the presence of 0.5% of the ZIF-67. The dry density of the cement paste-ZIF-67 composite increased and densified with the increase of nanoparticle content with the curing age. The water absorption decreased as the content of the nanoparticle additives increased. The total amount of water absorbed by the cement paste-ZIF-67 was smaller than the control samples, indicating improved durability. According to the calorimetry heat flow test, the ZIF-67 marginally slows the hydration process of cement by 1-2 hours, but considerably enhances its degree of hydration thereafter. The recommended mix proportion of the ZIF-67 to be used in the cement mixture is 0.5 wt. %.

Numerous modifications and variations of the present disclosure are possible in light of the above teachings. It is therefore to be understood that within the scope of the appended claims, the invention may be practiced otherwise than as specifically described herein.

The invention claimed is:

1. A cement paste composition, comprising:
a curable component comprising a cementitious material and a zeolitic imidazolate framework-67 (ZIF-67) present in an amount of 0.01 to 3% by weight based on a total weight of the cementitious material;
water in an amount of 30 to 50% by weight based on a total weight of the cement paste composition;
wherein a cured specimen made from the cement paste composition has a compressive strength of 30 to 80 megapascal (MPa) according to ASTM C109/C109M-21 standard test method, and a direct tensile strength of 1.2 to 2.2 MPa according to ASTM C307-18 standard test method, and wherein the ZIF-67 particles are uniformly distributed throughout the cured specimen,
wherein the compressive strength of the cured specimen made from the cement paste composition is 40 to 50% greater than that of a cured specimen made from a cement paste composition without the ZIF-67 as determined by ASTM C109/C109M-21.

2. The cement paste composition of claim 1, wherein the cementitious material comprises at least one selected from the group consisting of portland cement, pozzolan cement, gypsum cement, aluminous cement, silica cement, and alkaline cement.

3. The cement paste composition of claim 1, wherein the cementitious material is type I ordinary portland cement (OPC), and wherein the OPC has a standard specification of ASTM C150-21.

4. The cement paste composition of claim 1, wherein the ZIF-67 is present in the curable component of the cement paste composition in an amount of 0.1 to 1% by weight based on the total weight of the cementitious material.

5. The cement paste composition of claim 1, wherein the ZIF-67 particles have a mean particle size in a range of 5 to 150 nanometers (nm).

6. The cement paste composition of claim 1, wherein the ZIF-67 particles have a porous structure, and a mean pore size in a range of 0.5 to 5 nm.

7. The cement paste composition of claim 1, wherein the water is at least one selected from the group consisting of tap water, ground water, distilled water, deionized water, fresh water, and desalted water.

8. The cement paste composition of claim 1, wherein the water is desalted water, and wherein the desalted water is present in the cement paste composition in an amount of 35 to 45% by weight based on the total weight of the cement paste composition.

9. The cement paste composition of claim 1, wherein the direct tensile strength of the cured specimen made from the cement paste composition is 100 to 120% greater than that of a cured specimen made from a cement paste composition without the presence of ZIF-67 as determined by ASTM C307-18.

10. A cement specimen comprising a cement paste composition a cured form,
wherein the cement paste composition comprises:
a curable component comprising a cementitious material and a zeolitic imidazolate framework-67 (ZIF-67) present in an amount of 0.01 to 3% by weight based on a total weight of the cementitious material;
water in an amount of 30 to 50% by weight based on a total weight of the cement paste composition;
wherein the cured specimen has a compressive strength of 30 to 80 megapascal (MPa) according to ASTM C109/C109M-21 standard test method, and a direct tensile strength of 1.2 to 2.2 MPa according to ASTM C307-18 standard test method,
wherein the ZIF-67 particles are uniformly distributed throughout the cured specimen, and
wherein a weight ratio of the water to the curable component is in a range of 0.3:1 to 0.5:1,
wherein the cured specimen has a plurality of calcium silicate hydrates, wherein the calcium silicate hydrate has a layered structure with a basal spacing of 5 to 20 angstroms (Å) and a sheet morphology.

11. The cement specimen of claim 10, having a water absorption of 15 to 25% by weight based on a total weight of the cement paste composition after curing.

12. The cement specimen of claim 10, having a dry density of 1.55 to 1.80 $g/cm^3$ after curing.

13. The cement specimen of claim 10, having a higher degree of hydration than that of a cement paste made from the same composition but without the ZIF-67 according to ASTM C1679-17 standard test method.

* * * * *